(12) United States Patent
Muck

(10) Patent No.: US 8,480,175 B2
(45) Date of Patent: Jul. 9, 2013

(54) SLOT CAM FOR RECLINE HANDLE MOTION DURING EGRESS MECHANISM FUNCTION

(75) Inventor: Todd Rupert Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 338 days.

(21) Appl. No.: 12/915,152

(22) Filed: Oct. 29, 2010

(65) Prior Publication Data
US 2012/0104820 A1   May 3, 2012

(51) Int. Cl.
*B60N 2/02* (2006.01)
*B60N 2/00* (2006.01)

(52) U.S. Cl.
USPC ............................. 297/378.12; 297/341

(58) Field of Classification Search
USPC ................................. 297/341, 342, 378.12
See application file for complete search history.

(56) References Cited

U.S. PATENT DOCUMENTS

| | | | |
|---|---|---|---|
| 4,101,169 A | 7/1978 | Muraishi et al. | |
| 5,482,349 A | 1/1996 | Richter et al. | |
| 5,570,931 A | 11/1996 | Kargilis et al. | |
| 5,597,206 A | 1/1997 | Ainsworth et al. | |
| 5,813,726 A | 9/1998 | Husted | |
| 6,007,153 A | 12/1999 | Benoit et al. | |
| 6,139,104 A | 10/2000 | Brewer | |
| 6,152,533 A | 11/2000 | Smuk | |
| 6,328,381 B1 | 12/2001 | Smuk | |
| 6,336,679 B1 | 1/2002 | Smuk | |
| 6,523,899 B1 | 2/2003 | Tame | |
| 6,827,404 B2 | 12/2004 | Blair et al. | |
| 6,926,364 B2 | 8/2005 | Cooley et al. | |
| 7,172,253 B2 | 2/2007 | Haverkamp | |
| 2004/0217638 A1 | 11/2004 | Shao | |
| 2007/0182231 A1 | 8/2007 | Lutzka et al. | |
| 2010/0133886 A1* | 6/2010 | Gi et al. | 297/341 |

* cited by examiner

*Primary Examiner* — Milton Nelson, Jr.
(74) *Attorney, Agent, or Firm* — Gifford, Krass, Sprinkle, Anderson & Citkowski, P.C.

(57) ABSTRACT

The present invention provides for an automotive vehicle seat assembly allowing for fold flat functionality as well as sliding capabilities along a track located within the automotive vehicle. The seating assembly further including a plate. The seating assembly includes a handle bracket having an abutting edge, a biasing member connected to the handle bracket, and a planar bracket having a first end and a second end. The first end of the planar bracket having a stopper which abuts the abutting edge when in contact. The second end of the planar bracket operable to connect to a cable wherein the cable connects to a release mechanism allowing for movement of the seat assembly along the vehicle track. Sliding forward motion of the seat assembly is created when the handle bracket is rotated forward wherein the abutting edge contacts the stopper at the first end of the planar bracket, the planar bracket then rotates about a pivot point thereby pulling the cable and releasing a mechanism to allow for travel of the vehicle seat assembly. The fold flat functionality of the seat assembly occurs when the handle bracket is rotated upwards and the abutting edge travels over the stopper at the first end of the planar bracket thereby not activating the cable however still folding the seat back to a generally perpendicular position of the overall vehicle seat assembly.

5 Claims, 5 Drawing Sheets

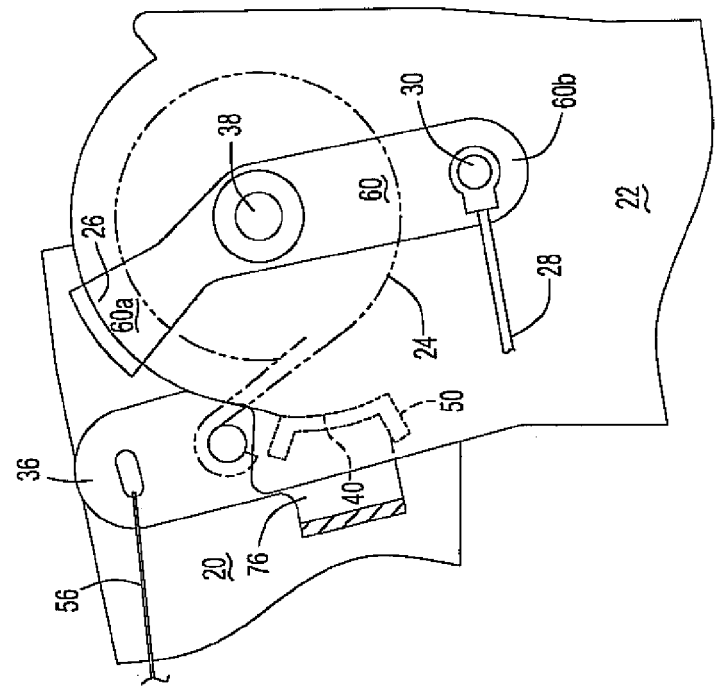
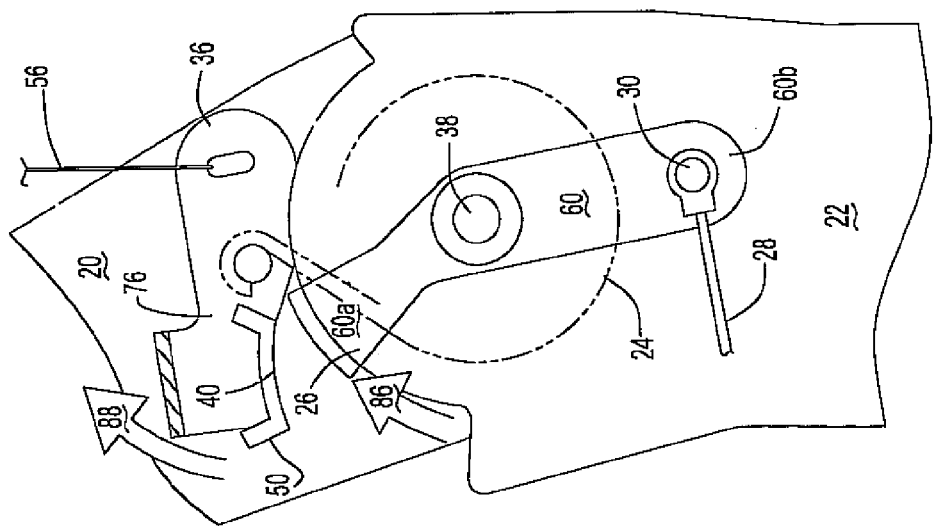

SLOT CAM FOR RECLINE HANDLE MOTION DURING EGRESS MECHANISM FUNCTION

FIELD OF THE INVENTION

This invention relates generally to automotive vehicle seats. In particular, this invention relates to automotive vehicle seats having the ability to slide along a track allowing for movement within a vehicle.

BACKGROUND OF THE INVENTION

It is known in the art to allow an automotive vehicle seat to slide from a first position to a second position to allow for passengers to enter and exit the vehicle. Sliding movement along a track of an automotive vehicle seat as well as a folding flat movement of a seat back of an automotive vehicle seat is also known. The functionality of a sliding automotive vehicle seat as well as a folding flat function of a vehicle seat is currently achieved by using numerous components (up to 28 components) thereby increasing complexity, difficulty of installation, and overall weight of the vehicle. The fold flat functionality of an automotive vehicle seat is highly desirable as it allows users of the vehicle to have significantly increased storage capabilities within the automotive vehicle. Automotive vehicle seats having sliding capability also increases overall storage space within a vehicle, and allows for users in a third row seat to access said third row seat in a much easier fashion.

It is known in the art to provide said sliding vehicle seats with a handle wherein the user of the seat pulls on the handle activating a cord wherein the automotive seat would slide forward or backward depending on user desire. Accordingly, it is highly desirable to provide a I seating assembly having fold flat function and sliding capability wherein the number of components is highly reduced thereby decreasing the overall weight and complexity of a vehicle seat assembly.

SUMMARY OF THE INVENTION

The present invention provides for an automotive vehicle seat assembly allowing for fold flat functionality as well as sliding capabilities along a track located within the automotive vehicle. The seating assembly further including a plate. The seating assembly is operable to pivot and slide an automotive vehicle seat. The seating assembly further including a handle bracket having an abutting edge, a biasing member connected to the handle bracket, and a planar bracket having a first end and a second end. The first end of the planar bracket having a stopper which abuts the abutting edge when in contact. The second end of the planar bracket operable to connect to a cable wherein the cable connects to a release mechanism allowing for movement of the seat assembly along the vehicle track. The planar bracket is pivotable about a first pivot point on the plate.

Sliding forward motion of the seat assembly is created when the handle bracket is rotated forward wherein the abutting edge contacts the stopper at the first end of the planar bracket, the planar bracket then rotates about a pivot point thereby pulling the cable and releasing a mechanism to allow for travel of the vehicle seat assembly. The fold flat functionality of the seat assembly occurs when the handle bracket is rotated upwards and the abutting edge travels over the stopper at the first end of the planar bracket thereby not activating the cable however still folding the seat back to a generally perpendicular position of the overall vehicle seat assembly.

BRIEF DESCRIPTION OF THE DRAWINGS

FIG. 6C is a side view showing the fold flat functionality of the seat assembly; and FIG. 6D is a side view showing the fold flat functionality of the seat assembly.

DETAILED DESCRIPTION OF THE PREFERRED EMBODIMENTS

Figure 1:
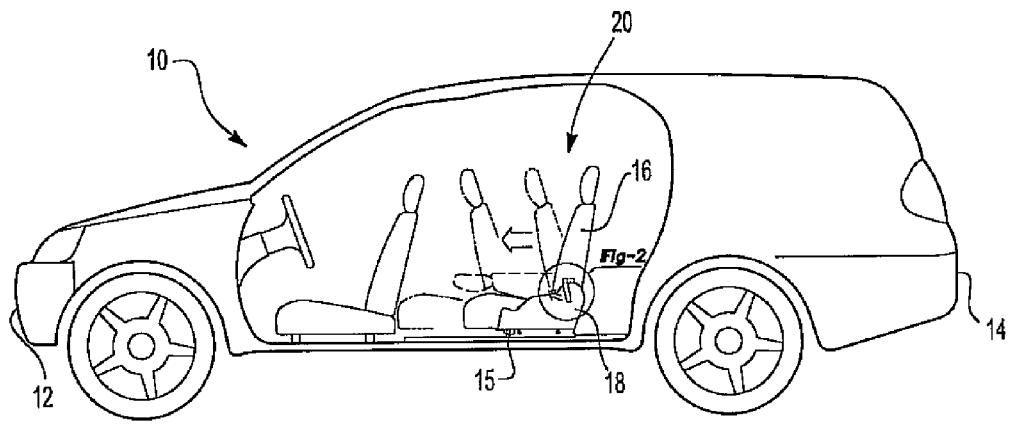
FIG. 1 is an environmental view of a vehicle having a sliding and fold flat seat functionality of a vehicle seat.
Figure 2:
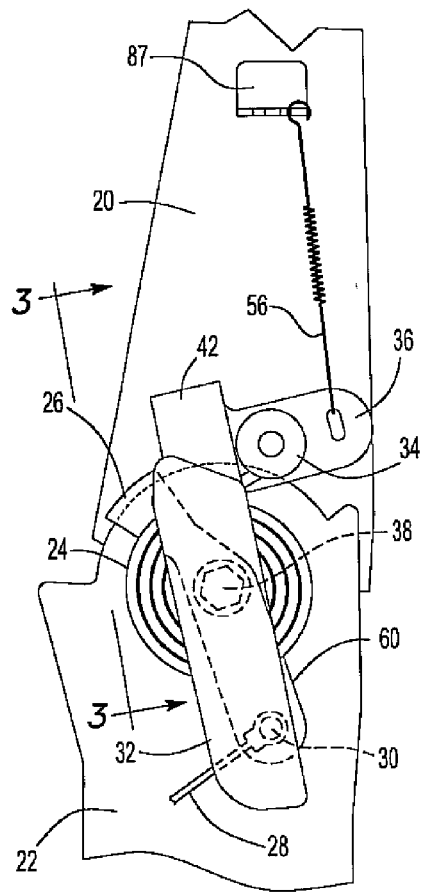
FIG. 2 is a side view of a seat assembly having the sliding and fold flat functionality.
Figure 3:
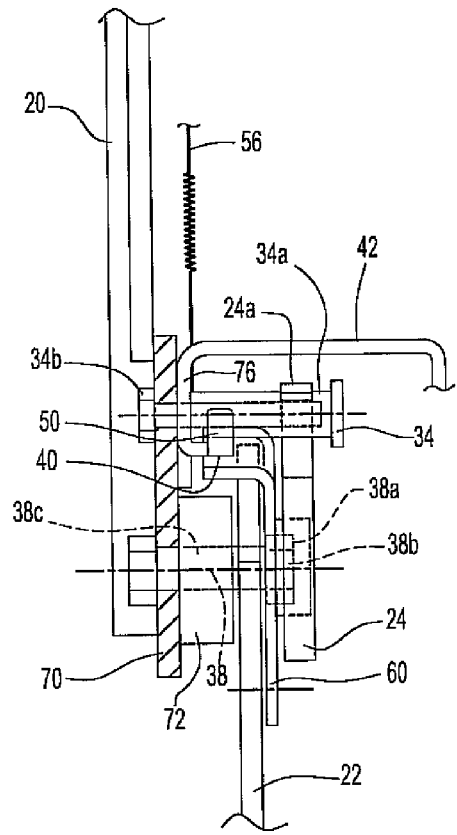
FIG. 3 is a cross-sectional view along the line 3-3 (as shown in FIG. 2)
Figure 4:
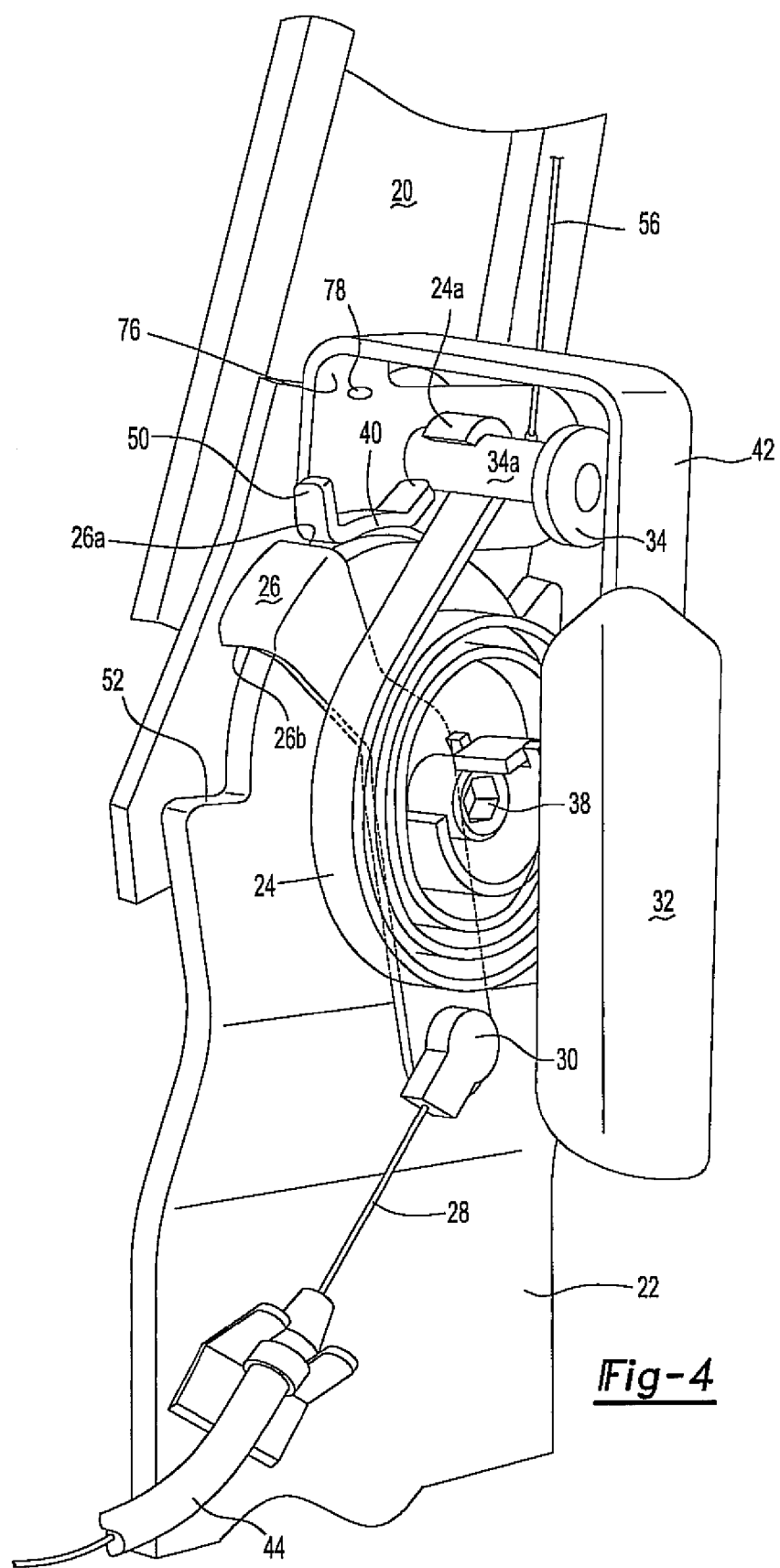
FIG. 4 is a perspective view of the seat assembly.
Figure 5:
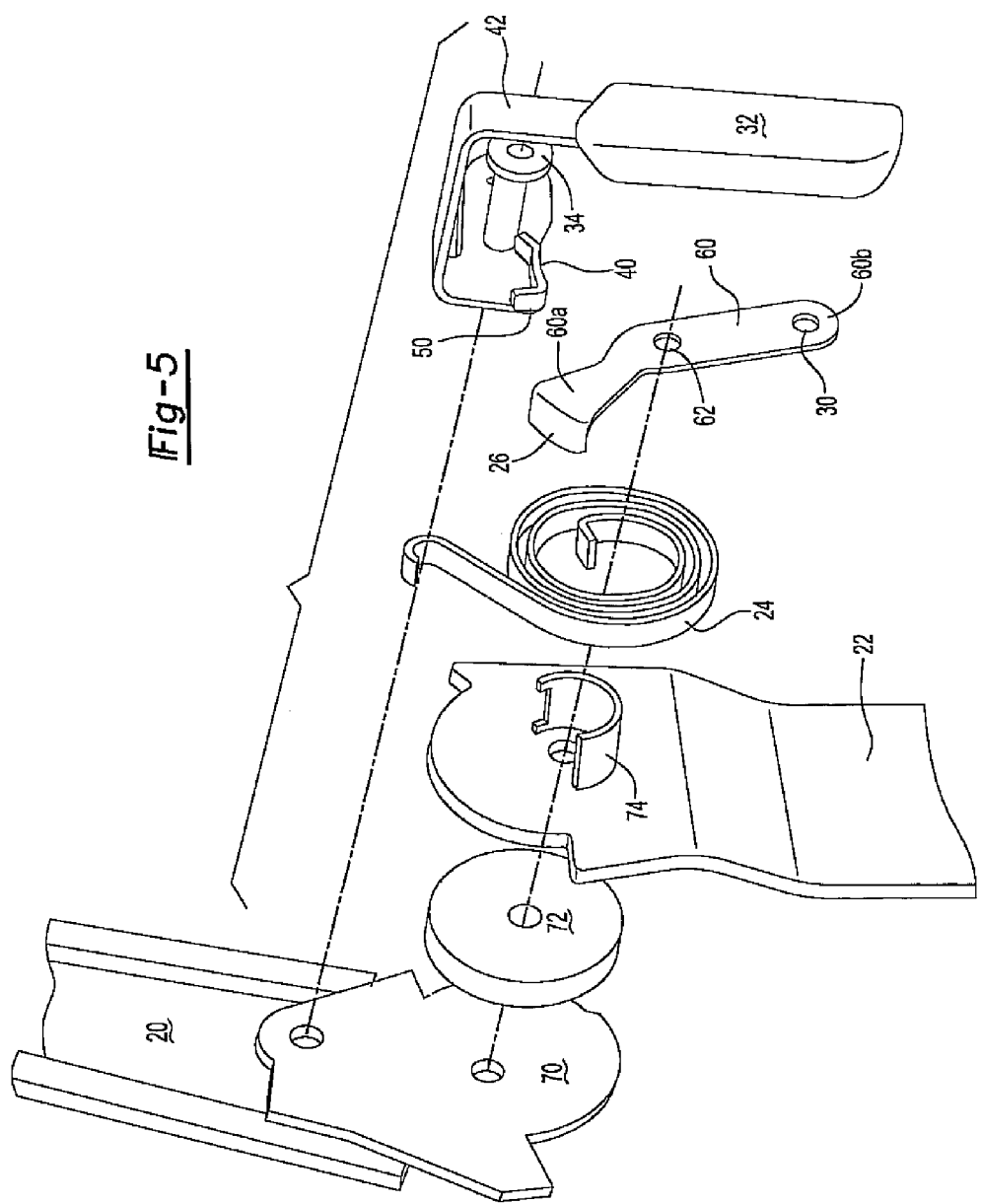
FIG. 5 is an exploded perspective view of the seat assembly.

The present invention provides for a seat assembly 20 located within a vehicle 10 having sliding and fold flat functionality. The sliding and fold flat functionality is created by means of a handle mechanism 18 located on the seat assembly 20. The seat assembly moves from a fixed position to a forward and folded position from the rear of the vehicle 14 to the front of the vehicle 12. The seat assembly 20 moves on a track 15. The track 15 may have a plurality of separate track 15 elements to provide greater stability.

As shown in FIGS. 2-5, the sliding and fold flat functionality of the seat assembly 20 is accomplished by means of few moving parts. A seat back 16 and main bracket 22 are pivotably connected about main pivot point 38. A main handle bracket 76 includes handle member 42 and handle 32. The handle bracket 76 includes an abutting member 40 having an abutting edge 50. The abutting edge 50 includes a slightly ramped angle.

A planar bracket 60 is pivotable about the main pivot point 38. The planar bracket 60 includes a first end 60a and a second end 60b. The first end 60a has a stopper 26. The second end 60b includes a connection point 30 wherein a cable 28 is connected to the connection point 30. The handle bracket 76 is pivotable about a pin 34.

Other elements also pivot about or are centered around the main pivot point 38 including the planar bracket 60 and the biasing member 24. Furthermore, the pivot point 38 creates a main first axis wherein the planar bracket 60 and the biasing member pivot about. The pivot point 38 pivots about a pin 38c having a two part bolt head 38a, 38b. The pin 38c acts as the main pivot point 38 allowing the planar bracket 60 to pivot about it.

A biasing member or clock spring 24 pivots about the main pivot point 38 and further connects to the pin 34a. The clock spring 24 provides for biasing movement and added force to movement of the handle bracket 76. The clock spring 24 includes a first end 24a. The first end 24a wraps around the pin 34. In this embodiment, the abutting member 40 is connected directly to the handle member 76. When the handle member 76 is rotated, the abutting member 40 moves with the handle member 76. The stopper 26 further includes a first end 26a and a second end 26b. The main bracket 22 includes a stop point 52. The cable 28 is further connected to cable housing and release mechanism 44.

Figure 6B:
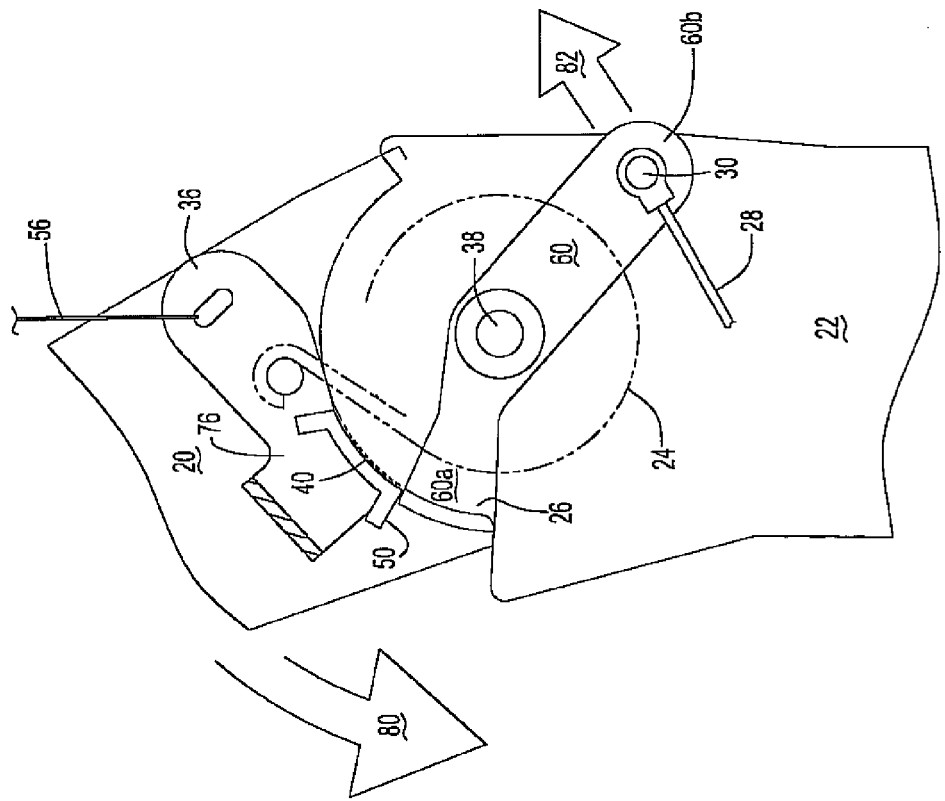
FIG. 6B is a side view showing the sliding functionality of the seat assembly.
Figure 6A:
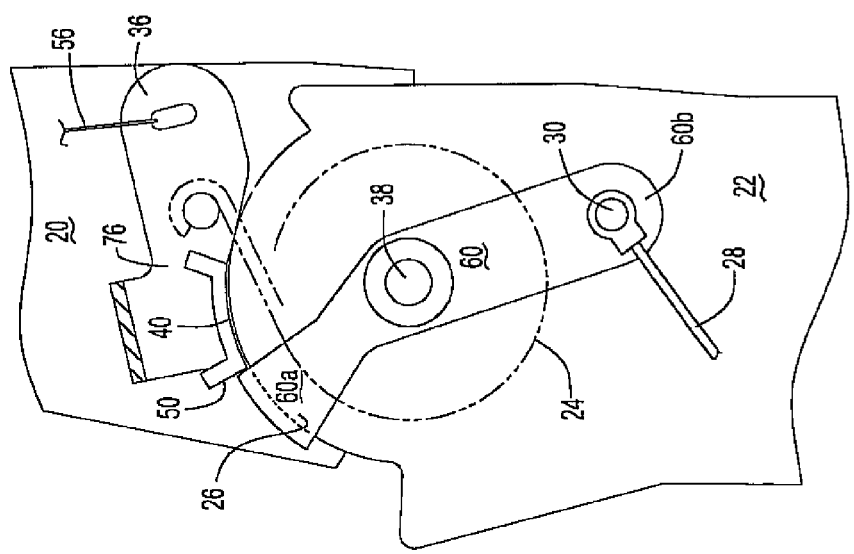
FIG. 6A is a side view showing the sliding functionality of the seat assembly.

As shown in FIGS. 6A and 6B, the seat assembly is capable of producing a sliding forward movement along the track of an automotive vehicle. The sliding movement is created when the user rotates a handle 32 located on the side or shoulder of the seat assembly 20. The abutting member 40 is connected to the handle bracket 76. Upon rotation of the handle bracket 76, the abutting edge 50 of the abutting member 40 contacts the first edge 26a of the stopper 26. The abutting edge 50 and the first edge 26a of the stopper 26 are now in contact. The user then continues to rotate the handle 32 connected to the handle bracket 76 thereby rotating the planar bracket 60. The abutting member 40 connected to the handle bracket 76 pushes the stopper 26 to create the rotation of the planar bracket 60. Rotation at the planar bracket 60 pulls the cable 28. The pulling of the cable 28 actuates a release mechanism 44 thereby releasing the seat assembly to allow for forward movement of the seat assembly 20 along the track (track not shown).

The user continues to rotate the handle 32 connected to the handle bracket 76 wherein the abutting member 40 continues to push on the stopper 26 until the stopper 26 reaches stopping point 52 on the main bracket 22. The second end 26b of the stopper 26 is now in contact with the stopping point 52. The stopping point 52 is provided to stop movement of the seat back 16. The stopping point 52 prevents unwanted forward movement of the seat back 16.

When the abutting edge 50 is in contact with first edge 26a of the stopper 26, and the second edge 26b of the stopper 26 is in contact with the stopping point 52 of the main bracket 22, the user is able to fully slide the seat assembly 20 to a fully forward position allowing for easier ingress and egress of a vehicle passenger accessing a third row seat. The seat assembly 20 includes a lower bracket 70. The forward rotation of the handle bracket 76 having the abutting member 40 having the abutting edge 50 in full contact with the first edge 26a of the stopper 26 and the second edge 26b in full contact with the stopping point 52 is shown by movement arrow 80. Full rotation of the planar bracket 60 pulling the cable 28 to release the release mechanism to allow for movement and sliding of the seat assembly 20 is shown by movement arrow 82. A guide 74 is positioned on the main bracket 22. A washer 72 is positioned between the lower bracket 70 and the main bracket 22.

In an alternative embodiment, a cable attaches to handle bracket 76 at aperture 78. In this embodiment, the handle member 42 and the handle 32 connected to the handle bracket are removed. Actuation of the seat assembly if accomplished with a user pulls the cable connected to aperture 78 of the handle bracket 76.

The fold flat functionality is shown in FIGS. 6C and 6D. The fold flat functionality allows a seat back 16 to be in a position generally perpendicular to the main bracket 22. The fold flat functionality provides for increased storage for users of the vehicle 10. The fold flat functionality is achieved by the abutting member 40 traveling over the stopper 26. Upon an upward rotation by the user of the handle 32 connected to the handle bracket 76, the abutting member and the handle bracket 76 travel over the stopper 26 connected to the planar bracket 60. The abutting edge 50 of the abutting member 40 includes a slight relief angle between 0.5° and 15° to allow for easy travel when the abutting edge 50 comes into contact with the first edge 26a of the stopper 26.

In an alternative embodiment, a spring 56 is connected to a bracket 87 to allow a user of a vehicle seat to actuate the seat assembly from a different location. In an alternative embodiment, the spring 56 is a cable or other actuating mechanism.

The upward movement of the handle bracket is shown by movement arrow 88. Once the abutting member 40 and the handle bracket 76 travel over the stopper 26, the planar bracket 60 and the stopper 26 may rotate slightly past the abutting member 40 as shown by movement arrow 86. When the user continues to rotate the handle 32 connected to the handle bracket 76 in an upward rotating fashion, the abutting member 40 and the handle bracket 76 continue to rotate until the abutting edge 50 of the abutting member 40 comes into contact with the stopping point 52. Once the abutting edge 50 is in full contact with the stopping point 52, the seat back 16 is in a fully folded flat position as shown by movement arrow 84. The fully folded flat position is shown in FIG. 6D wherein the seat back 16 and the main bracket 22 create a generally perpendicular angle. The planar bracket 60 and the cable 28 are not rotated during this bypass functionality of the fold flat function rotation. Since the planar bracket 60 and the cable 28 are never rotated, the vehicle seat never travels but only folds flat.

This invention is not restricted to the illustrative examples and embodiments described above. The embodiments are not intended as limitations on the scope of the invention. Methods, apparatuses, compositions, and the like described herein are exemplary and are not intended as limitations on the scope of the invention. Changes therein and other uses will occur to those skilled in the art. The scope of the invention is described by the scope of the claims.

I claim:

1. A seat assembly operable to pivot and slide an automotive vehicle seat, the seat assembly comprising:
   a plate having a first pivot point;
   a handle bracket pivotable about the first pivot point, the handle bracket connected to the plate, the handle bracket having an abutting member, the abutting member having an abutting edge and a lower surface;
   a biasing member connected to the handle bracket; and
   a planar bracket pivotable about the first pivot point, the planar bracket connected to the plate, the planar bracket having a first end and a second end, the first end having a stopper abutting the abutting edge, the stopper having an upper surface, the second end connected to a cable,
   wherein the lower surface of the abutting member of the handle bracket slides over the upper surface of the stopper on the first end of the planar bracket thereby allowing a seat back of the vehicle seat to fold flat without triggering a cable.

2. The seat assembly of claim 1, wherein the biasing member is a clock spring.

3. The seat assembly of claim 1, wherein the abutting edge has a predetermined angle.

4. The seat assembly of claim 3, wherein the predetermined angle of the abutting edge of the handle bracket ranges between 0.5° and 15°.

5. The seat assembly of claim 1, wherein the cable connected to the second end of the planar bracket releases a mechanism allowing for movement of the seat assembly on a track.

* * * * *